(12) United States Patent
Kanakasabai

(10) Patent No.: US 9,520,741 B2
(45) Date of Patent: Dec. 13, 2016

(54) SYSTEM FOR CHARGING ELECTRICAL STORAGE DEVICE AND METHOD OF MAKING SAME

(75) Inventor: Viswanathan Kanakasabai, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1165 days.

(21) Appl. No.: 13/304,791

(22) Filed: Nov. 28, 2011

(65) Prior Publication Data

US 2013/0134924 A1     May 30, 2013

(51) Int. Cl.
    *H02J 7/14*      (2006.01)
    *H02J 7/00*      (2006.01)
    *B60K 1/00*      (2006.01)
    (Continued)

(52) U.S. Cl.
CPC .............. *H02J 7/1423* (2013.01); *B60L 1/003* (2013.01); *B60L 7/14* (2013.01); *B60L 11/005* (2013.01); *B60L 11/1803* (2013.01); *B60L 11/1861* (2013.01); *B60L 11/1887* (2013.01); *B60L 15/007* (2013.01); *H02J 1/08* (2013.01); *B60L 2200/22* (2013.01); *B60L 2210/14* (2013.01); *B60L 2240/547* (2013.01); *B60L 2240/622* (2013.01); *H02J 7/1438* (2013.01); *H02M 3/158* (2013.01); *H02M 3/335* (2013.01); *H02M 2001/009* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7225* (2013.01); *Y02T 10/7291* (2013.01); *Y02T 90/16* (2013.01); *Y02T 90/162* (2013.01); *Y02T 90/34* (2013.01); *Y10T 29/49117* (2015.01); *Y10T 307/50* (2015.04); *Y10T 307/707* (2015.04)

(58) Field of Classification Search
CPC ..... H02J 7/0054; Y02E 60/12; Y02T 90/127
USPC .......... 320/103, 104; 307/149–152; 180/65.1
See application file for complete search history.

(56) References Cited

U.S. PATENT DOCUMENTS 4,920,475 A     4/1990   Rippel
5,633,577 A *   5/1997   Matsumae ............ H02J 7/0013
                                                    320/104

(Continued)

OTHER PUBLICATIONS

Sawant, "Electric Cars," Indian Institute of Technology, Bombay, Golden Jubilee 2008, Indo German Winter Academy 2009, pp. 1-29.

(Continued)

*Primary Examiner* — Richard Isla Rodas
*Assistant Examiner* — Michael Dibenedetto
(74) *Attorney, Agent, or Firm* — Meagher Emanuel Goldberg & Liao, LLP

(57) ABSTRACT

A system for charging an electrical storage device includes a motor drive, a DC link electrically coupled to the motor drive, and a first leg coupled to the DC link that includes a first power switch coupled in series with a second power switch via a first node. A first inductor is coupled to the first node, and a first energy storage device (ESD) is electrically coupled to the first inductor. A second leg is coupled to the DC link that includes a third power switch coupled in series with a fourth power switch via a second node. A charging circuit includes a transformer coupled to the first and second nodes. A second ESD is coupled to receive charging energy from the transformer, and a controller is configured to cause a first voltage mismatch between the first and second nodes to generate the charging energy.

20 Claims, 3 Drawing Sheets

(51) Int. Cl.
*H02J 1/08* (2006.01)
*B60L 1/00* (2006.01)
*B60L 7/14* (2006.01)
*B60L 11/00* (2006.01)
*B60L 11/18* (2006.01)
*B60L 15/00* (2006.01)
*H02M 3/158* (2006.01)
*H02M 3/335* (2006.01)
*H02M 1/00* (2006.01)

(56) References Cited

U.S. PATENT DOCUMENTS

| | | | | |
|---|---|---|---|---|
| 6,037,745 | A * | 3/2000 | Koike | H02J 7/0029 320/104 |
| 6,593,722 | B2 * | 7/2003 | Purdy | H02J 7/00 320/104 |
| 6,724,100 | B1 | 4/2004 | Gabriel | |
| 6,917,180 | B2 | 7/2005 | Harrison et al. | |
| 7,932,699 | B2 | 4/2011 | Nam et al. | |
| 7,977,918 | B2 | 7/2011 | Nam et al. | |
| 8,030,882 | B2 * | 10/2011 | Ito | B60K 6/48 307/66 |
| 8,030,884 | B2 | 10/2011 | King et al. | |
| 8,421,271 | B2 | 4/2013 | King et al. | |
| 8,441,229 | B2 | 5/2013 | Lee et al. | |
| 8,487,582 | B2 | 7/2013 | King et al. | |
| 8,653,696 | B2 | 2/2014 | King et al. | |
| 8,698,451 | B2 | 4/2014 | King et al. | |
| 8,872,473 | B2 | 10/2014 | Song et al. | |
| 2007/0120523 | A1 * | 5/2007 | Holmes | H02M 7/06 320/103 |
| 2007/0120623 | A1 * | 5/2007 | Sakiyama | H03H 9/02834 333/133 |
| 2008/0205109 | A1 | 8/2008 | Darroman et al. | |
| 2010/0097031 | A1 | 4/2010 | King et al. | |
| 2012/0112702 | A1 * | 5/2012 | Steigerwald | B60L 3/0069 320/137 |
| 2012/0126742 | A1 * | 5/2012 | Reggio | H02M 3/33515 320/104 |
| 2013/0049703 | A1 * | 2/2013 | Perisic | H01M 10/44 320/162 |

OTHER PUBLICATIONS

"Hybrid System Operation," Toyota Hybrid System, Course 071, Toyota Technical Training, 2008, pp. 1-22.

* cited by examiner

SYSTEM FOR CHARGING ELECTRICAL STORAGE DEVICE AND METHOD OF MAKING SAME

BACKGROUND OF THE INVENTION

Embodiments of the invention relate generally to hybrid and electric vehicles and, more particularly, to transferring energy from one energy storage device (ESD) to another ESD of a traction system.

A hybrid electric vehicle (HEV) may combine an internal combustion engine and an electric motor powered by an energy storage device, such as a traction battery, to propel the vehicle. Typically, the electric motor of an HEV is coupled between the internal combustion engine and the transmission to take advantage of the torque increase through the transmission. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in HEVs to be smaller and more fuel efficient.

A purely electric vehicle (EV) typically uses stored electrical energy to power an electric motor, which propels the vehicle. EVs may use one or more sources of stored electrical energy and are configured to use energy from an external source to recharge the fraction battery or other storage devices. For example, a first source of stored energy (sometimes referred to as an "energy" source) may be used to provide longer-lasting energy while a second source of stored energy (sometimes referred to as a "power" source) may be used to provide higher-power for, for example, acceleration from standstill or boost during operation. First and second sources may include chemical-based batteries or may include ultracapacitors, as examples. Typically, the source(s) of electrical energy (energy and/or power batteries) in EVs are charged via a plug-in charger or other external energy source. With typically complete reliance on plug-in power, an EV may have increased energy storage capacity as compared to an HEV.

A plug-in hybrid vehicle (PHEVs) may include both an internal combustion engine and an electric motor powered by an energy storage device, such as a traction battery. Typically a PHEV is configured to use energy from an external source to recharge the traction battery or other storage devices. Thus, with increased reliance on plug-in power, a PHEV may have increased energy storage capacity as compared to an HEV.

There are generally two types of PHEV: parallel and series. In a parallel PHEV arrangement, the electric motor is coupled between the internal combustion engine and the transmission, enabling the combustion engine and the electric motor to each operate in respective ranges of increased efficiency, similar to an HEV. In a series PHEV arrangement, the electric motor is coupled between an energy storage device and the vehicle drive axle, while the internal combustion engine is coupled directly to the energy storage device and not to the vehicle drive axle. The series PHEV may also be referred to as an extended range electric vehicle (EREV), in reference to a purely electric drive system having energy augmentation to the energy storage system via the internal combustion engine and via, for instance, a liquid fuel storage system.

In general, EVs, HEVs, and PHEVs typically include regenerative braking to charge the charge storage devices during braking operations. Also, such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery.

Most such vehicles have two ESD packs, a high voltage (HV) ESD pack for the drive train and a low voltage (LV) ESD pack for auxiliary functions such as lighting and vehicle control systems. The HV ESD pack is often interfaced to the DC link coupled to the drive train using one or more DC-DC boost converters configured to boost the HV ESD pack voltage to a higher voltage for driving the drive train. In some systems, the LV ESD pack is charged from the HV pack using an additional step-down DC-DC converter. This additional DC-DC converter, however, adds cost and weight to the vehicle.

It would therefore be desirable to provide a system for charging the LV ESD pack from the HV ESD pack using existing components to minimize the use of additional components in the system.

BRIEF DESCRIPTION OF THE INVENTION

In accordance with one aspect of the invention, a propulsion system includes a motor drive, a direct current (DC) link electrically coupled to the motor drive, and a first leg coupled to the DC link that includes a first power switch coupled in series with a second power switch via a first node. A first inductor is coupled to the first node, and a first energy storage device (ESD) is electrically coupled to the first inductor. A second leg is coupled to the DC link that includes a third power switch coupled in series with a fourth power switch via a second node. A charging circuit includes a transformer having a first terminal coupled to the first node and having a second terminal coupled to the second node. The system also includes a second ESD coupled to receive charging energy from the transformer and a controller coupled to the first and second legs and configured to cause a first voltage mismatch between the first and second nodes during an interleave duration of a frequency period to generate the charging energy.

In accordance with another aspect of the invention, a method of assembling a control system includes coupling a first energy storage device (ESD) to a first DC-DC converter, coupling the first ESD to a second DC-DC converter, and coupling the first and second DC-DC converters to a DC link. The first DC-DC converter includes a first pair of power switches coupled in series and an inductor coupled to a first node formed between the first pair of power switches. The second DC-DC converter includes a second pair of power switches coupled in series and an inductor coupled to a second node formed between the second pair of power switches. The method further includes coupling the DC link to a motor drive, coupling a transformer of a charge circuit to the first and second nodes, and coupling a second ESD to the charge circuit to receive a charge voltage therefrom. The method also includes coupling a controller to the first and second DC-DC converters and configuring the controller to interleave control of the first and second DC-DC converters to cause a voltage difference between the first and second nodes during an interleave portion of a frequency period to generate the charge voltage.

In accordance with another aspect of the invention, an energy storage arrangement for an electrically powered system includes a first DC-DC converter that comprises a first pair of power switches comprising a first power switch coupled in series with a second power switch via a first node and a first inductor coupled to the first node. A first energy storage device is coupled to the first inductor. The arrangement also includes a DC link that includes a first bus coupled to the first DC-DC converter and a second bus coupled to the first DC-DC converter. A second pair of power switches includes a third power switch coupled to the first bus and a fourth power switch coupled to the second bus and coupled in series with the third power switch via a second node. The arrangement also includes a transformer having a first winding that comprises a first terminal coupled to the first node and a second terminal coupled to the second node. A second energy storage device is coupled to receive a charge voltage from the transformer, and a controller coupled to the first and second pairs of power switches and configured to cause a voltage difference between the first and second nodes during an interleave portion of a frequency period to generate the charge voltage.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
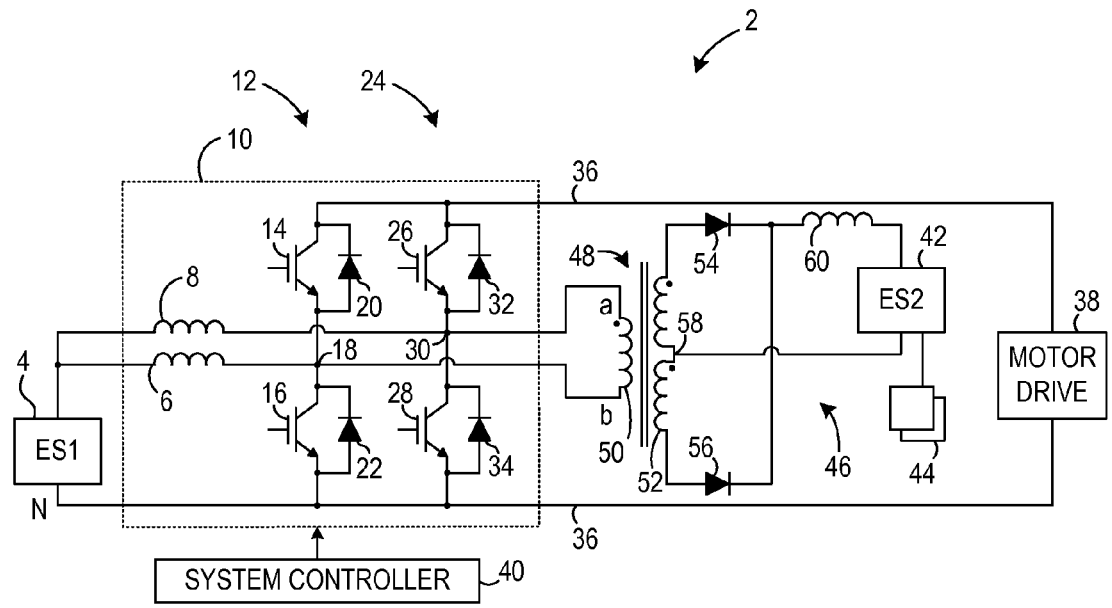
FIG. 1 is a schematic diagram of a fraction system in accordance with an embodiment of the invention.

FIG. 1 illustrates a schematic diagram of a traction system 2 usable in a vehicle, such as a plug-in electric or plug-in hybrid vehicle, or stationary electric drive system is shown in accordance with an embodiment of the invention. Traction system 2 includes a first energy storage device 4, which may be a battery, a fuel cell, an ultracapacitor, or the like, coupled to a pair of inductors 6, 8 of a bi-directional DC-DC voltage converter assembly 10. Inductor 6 is coupled to a first leg 12 including a first power switch 14 and a second power switch 16 connected in series at a first node 18. As used herein, a power switch may be a bipolar junction transistor (BJT), a metal-oxide-semiconductor field-effect transistor (MOSFET), an insulated gate bipolar transistors (IGBT), a contactor, or another power switch as known in the art. Each of the power switches 14, 16 is coupled in anti-parallel with a first and second diode 20, 22, respectively. In addition, inductor 8 is coupled to a second leg 24 including a third power switch 26 and a fourth power switch 28 connected in series at a second node 30. Each of the power switches 26, 28 is coupled in anti-parallel with a third and fourth diode 32, 34, respectively. Together, inductor 6 and first leg 12 form a first bi-directional DC-DC voltage converter (6/12), and inductor 8 and second leg 24 form a second bi-directional DC-DC voltage converter (8/24).

Voltage converter assembly 10 is coupled via a DC link 36 to a motor drive 38, which, according to an embodiment of the invention, includes a DC-AC inverter (not shown) and a motor or electromechanical device (not shown). While not shown, it is to be understood that motor drive 38 runs the motor that may be coupled to a wheels or other loads or that motor drive 38 may be coupled to a differential for distributing rotational power to the wheels or other rotational load.

Voltage converter assembly 10 is also coupled to a system controller 40, which controls power switches 14, 16, 26, and 28 during a motoring mode of operation to boost the voltage provided by ESD 4 to DC link 36. Motor drive 38 inverts the voltage on DC link 36 and provides the inverted voltage to its motor. During a regenerative braking mode of operation, motor drive 38 supplies voltage to DC link 36, and system controller 40 controls power switches 14, 16, 26, and 28 to buck the supplied voltage to a level sufficient to recharge ESD 4. In one embodiment, system controller 40 controls first and second legs 12, 24 in an interleaved configuration that includes system redundancy and that keeps conduction losses and switching losses low to achieve a high efficiency. In addition, the interleaved configuration keeps battery ripple current low when the interleaved legs (i.e., first and second legs 12, 24) are phase-delayed by 360/n degrees, where n is the number of interleaved legs.

For providing power to non-propulsion components of the system in which traction system 2 is incorporated, an auxiliary ESD 42 is included. Auxiliary ESD 42 provides power for one or more auxiliary loads 44 such as air conditioning, power steering pumps, oil pumps, coolant fans, air compressors, radios, navigation systems, and the like. Auxiliary ESD 42 typically has a lower voltage than ESD 4. That is, auxiliary ESD 42 is a low-voltage device, and ESD 4 is a high-voltage device.

As illustrated in FIG. 1, auxiliary ESD 42 is coupled to a charging circuit or system 46 that is coupled to voltage converter assembly 10 for receiving charging energy from ESD 4 to recharge auxiliary ESD 42 to a desired state of charge (SOC). Charging system 46 includes a transformer 48 having a primary winding 50 having a first terminal "a" coupled to second node 30 of second leg 24 and a second terminal "b" coupled to first node 18 of first leg 12. A secondary winding 52 of transformer 48 is coupled to a pair of diodes 54, 56 and has a winding tap 58 coupled to auxiliary ESD 42. Charging system 46 also includes an inductor 60 coupled to diodes 54, 56 and to auxiliary ESD 42.

During the motoring mode, as described above, system controller 40 controls power switches 14, 16, 26, and 28 in a continuous-conduction mode (CCM) using an interleaved configuration to boost the voltage provided by ESD 4 to DC link 36. This interleaved control of first and second legs 12 and 24 can be used to create voltage differences between terminals "a" and "b" of transformer 48 that are designed to provide power to recharge auxiliary ESD 42.

Figure 2:
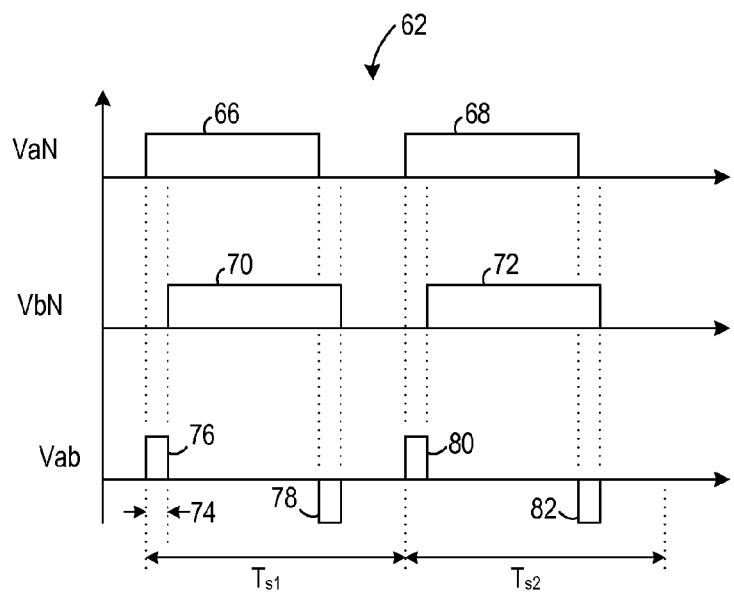
FIGS. 2 and 3 are pulse sequence diagrams illustrating interleaved control of the voltage converter legs of the traction system of FIG. 1 in accordance with an embodiment of the invention.
Figure 3:
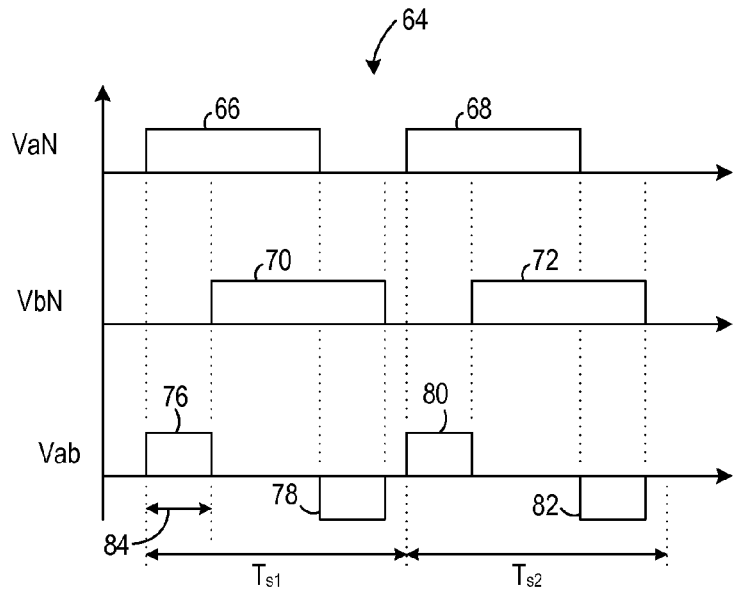

FIGS. 2 and 3 are pulse sequence diagrams 62, 64 illustrating interleaved control of the voltage converter legs 12, 24 of the traction system 2 of FIG. 1 to control charging voltage in accordance with an embodiment of the invention. Referring to FIGS. 1-3, a pair of frequency periods, $T_{s1}$ and $T_{s2}$, are illustrated. During the frequency periods, first and second legs 12, 24 are controlled by system controller 40 during a motoring mode to boost the voltage from ESD 4 to DC link 36. In one embodiment, system controller 40 is configured to operate the boost converters 6/12 and 8/24 according to a continuous conduction mode (CCM), and boost converters 6/12 and 8/24 share equal power. A voltage, VaN, between terminal "a" of transformer 48 and terminal "N" of ESD 4 is illustrated by pulses 66, 68, and a voltage, VbN, between terminal "b" of transformer 48 and terminal "N" of ESD 4 is illustrated by pulses 70, 72. Pulses 66-72 correspond with the off-state voltages of the boost converters 6/12 and 8/24. That is, pulses 66, 68 are formed when second power switch 16 is on, and pulses 70, 72 are formed when fourth power switch 28 is on.

A voltage difference, Vab, is formed when voltages 66, 70 are offset or interleaved from one another during the frequency period, $T_{s1}$. This mismatched voltage difference, Vab, is seen across primary winding 50 of transformer 48 when the voltage, VaN, is different from the voltage, VbN. When the voltage difference, Vab, exists, charging system 46 acts to convert the voltage difference to a charging voltage for recharging auxiliary ESD 42.

System controller 40 is configured to interleave the operation of the boost converters 6/12 and 8/24 based on the SOC of auxiliary ESD 42 and based on other factors such as the ability of auxiliary ESD 42 to accept a charge, the temperature of auxiliary ESD 42, and the turns ratio of transformer 48. If desired, the turns ratio of transformer 48 may be appropriately designed to accommodate an average amount of expected voltage differences to be supplied during the frequency periods. Other factors may also influence the amount of charging voltage to be supplied to auxiliary ESD 42.

As shown in FIG. 2, system controller 40 causes first and second legs 12, 24 to operate offset from one another by an interleave angle 74 (e.g., such as 30 degrees) such that voltage difference pulses 76, 78 are seen across primary winding 50 during frequency period, $T_{s1}$. During the subsequent frequency period, $T_{s2}$, the interleaving of pulses 68 and 72 causes voltage difference pulses 80, 82 to be seen across primary winding 50.

As shown in FIG. 3, system controller 40 causes first and second legs 12, 24 to operate offset from one another by a larger interleave angle 84 (e.g., such as 90 degrees) than interleave angle 74. Accordingly, a larger amount of charging voltage will be supplied to auxiliary ESD 42 compared with the amount of charging voltage supplied by interleave angle 74. While not shown, it is to be understood that no difference voltage, Vab, is created when first and second legs 12, 24 are not operated in an interleaved manner. That is, when first and second legs 12, 24 are operated with an interleave angle of zero degrees, no interleaving occurs, and no charging voltage is created thereby.

Figure 4:
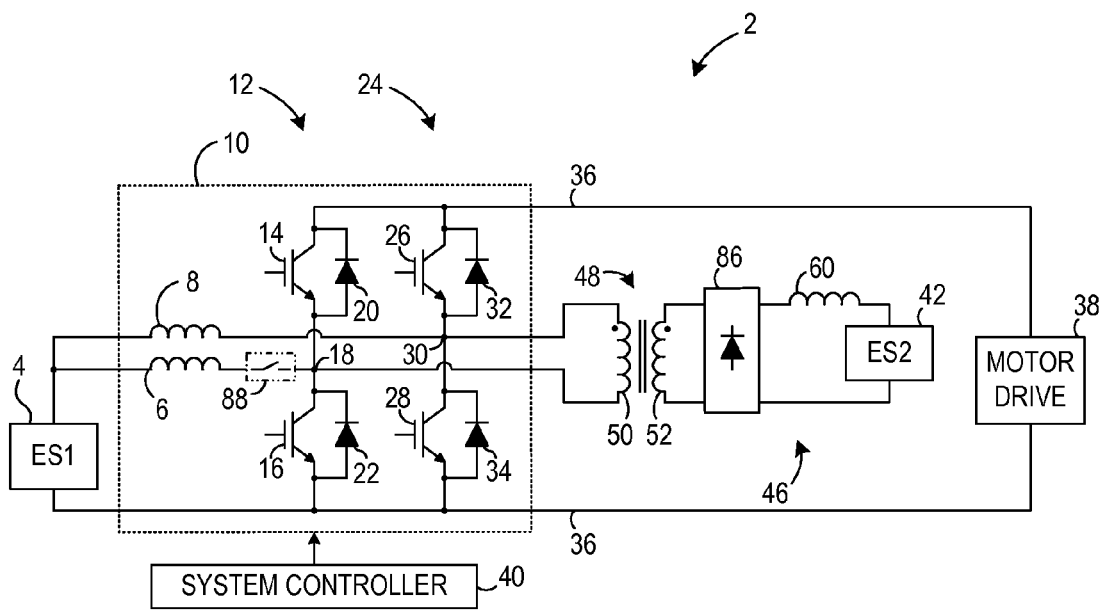
FIG. 4 is a schematic diagram of the traction system of FIG. 1 in accordance with another embodiment of the invention.

FIG. 4 is a schematic diagram illustrating the traction system of FIG. 1 in accordance with another embodiment of the invention. In this embodiment, secondary winding 52 of transformer 48 is not tapped but is coupled to a full-wave diode bridge 86 configured to fully rectify the voltage induced on secondary winding 52. CCM control of the interleave angle as described above with respect to FIGS. 1-3 may also be used to control traction system 2 in this embodiment According to another embodiment, system controller 40 may control first and second legs 12 and 24 in a discontinuous-conduction mode (DCM) to provide charging voltage from ESD 4 to recharge auxiliary ESD 42. In this embodiment, a switch 88 (shown in phantom) such as a contactor or other power switching device may be used to selectively decouple or disconnect inductor 6 from power switches 14, 16 and from primary winding 50 of transformer 48. With switch 88 in its open state, power switches 14 and 16 may be independently controlled to control voltage differences between terminals "a" and "b" of transformer 48. In this embodiment, voltage converter assembly 10 behaves as a phase-shifted converter.

Figure 5:
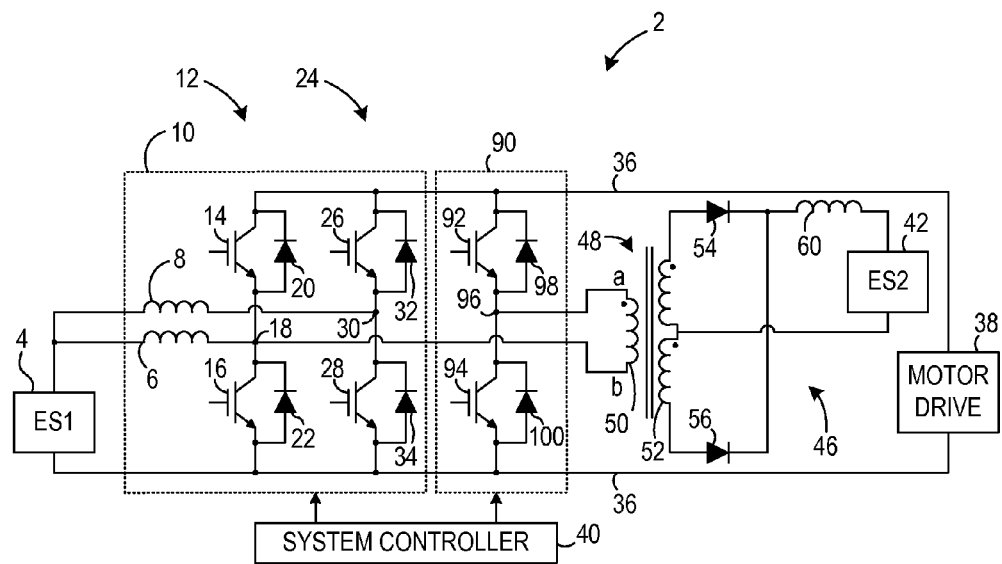
FIG. 5 is a schematic diagram of the traction system of FIG. 1 in accordance with another embodiment of the invention.

FIG. 5 is a schematic diagram illustrating the traction system of FIG. 1 in accordance with another embodiment of the invention. In this embodiment, terminal "b" of primary winding 50 remains coupled to first node 18 of first leg 12. However, terminal "a" of primary winding 50 is coupled to an auxiliary leg 90 that is coupled across DC link 36. Auxiliary leg 90 includes a pair of power switches 92, 94 coupled in series together at a third node 96 and coupled in anti-parallel with respective diodes 98, 100. While power switches 14, 16, 26, and 28 and diodes 20, 22, 32, and 34 of first and second legs 12, 24 are rated for motor drive 38, power switches 92, 94 and diodes 98, 100 need only to be rated for charging system 46, which has a lower rating than motor drive 38 in a typical embodiment. That is, the components of first and second legs 12, 24 may be high-current components while the components of auxiliary leg 90 may be low-current components.

System controller 40 is also coupled to auxiliary leg 90 and is configured to interleave first leg 12 and auxiliary leg 90 to control the amount of charging energy supplied to auxiliary ESD 42. Since the interleave angle between first and second legs 12, 24 is not configured to affect the amount of charging energy, system controller 40 can control the interleaving of first and second legs 12, 24 according to 360/n degrees, where n is the number of interleaved legs. In this manner, system controller 40 may interleave first and second legs 12, 24 by 180 degrees to optimize battery ripple current independently from the interleaving of auxiliary leg 90 with first leg 12.

Figure 6:
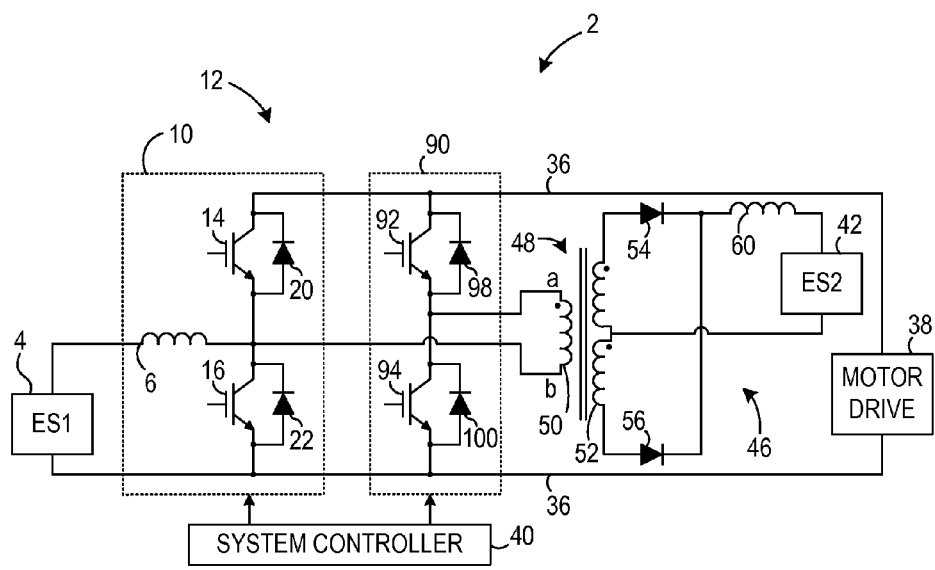
FIG. 6 is a schematic diagram of the traction system of FIG. 1 in accordance with another embodiment of the invention.

While two voltage converters 6/12 and 8/24 are shown in FIG. 5, embodiments of the invention contemplate a single bi-directional DC-DC voltage converter arrangement or an arrangement including three or more bi-directional DC-DC voltage converters. For example, FIG. 6 shows the traction system 2 of FIG. 5 without the second bi-directional DC-DC voltage converter 8/24.

Therefore, according to one embodiment of the invention, a propulsion system includes a motor drive, a direct current (DC) link electrically coupled to the motor drive, and a first leg coupled to the DC link that includes a first power switch coupled in series with a second power switch via a first node. A first inductor is coupled to the first node, and a first energy storage device (ESD) is electrically coupled to the first inductor. A second leg is coupled to the DC link that includes a third power switch coupled in series with a fourth power switch via a second node. A charging circuit includes a transformer having a first terminal coupled to the first node and having a second terminal coupled to the second node. The system also includes a second ESD coupled to receive charging energy from the transformer and a controller coupled to the first and second legs and configured to cause a first voltage mismatch between the first and second nodes during an interleave duration of a frequency period to generate the charging energy.

According to another embodiment of the invention, a method of assembling a control system includes coupling a first energy storage device (ESD) to a first DC-DC converter, coupling the first ESD to a second DC-DC converter, and coupling the first and second DC-DC converters to a DC link. The first DC-DC converter includes a first pair of power switches coupled in series and an inductor coupled to a first node formed between the first pair of power switches. The second DC-DC converter includes a second pair of power switches coupled in series and an inductor coupled to a second node formed between the second pair of power switches. The method further includes coupling the DC link to a motor drive, coupling a transformer of a charge circuit to the first and second nodes, and coupling a second ESD to the charge circuit to receive a charge voltage therefrom. The method also includes coupling a controller to the first and second DC-DC converters and configuring the controller to interleave control of the first and second DC-DC converters to cause a voltage difference between the first and second nodes during an interleave portion of a frequency period to generate the charge voltage.

According to another embodiment of the invention, an energy storage arrangement for an electrically powered system includes a first DC-DC converter that comprises a first pair of power switches comprising a first power switch coupled in series with a second power switch via a first node and a first inductor coupled to the first node. A first energy storage device is coupled to the first inductor. The arrangement also includes a DC link that includes a first bus coupled to the first DC-DC converter and a second bus coupled to the first DC-DC converter. A second pair of power switches includes a third power switch coupled to the first bus and a fourth power switch coupled to the second bus and coupled in series with the third power switch via a second node. The arrangement also includes a transformer having a first winding that comprises a first terminal coupled to the first node and a second terminal coupled to the second node. A second energy storage device is coupled to receive a charge voltage from the transformer, and a controller coupled to the first and second pairs of power switches and configured to cause a voltage difference between the first and second nodes during an interleave portion of a frequency period to generate the charge voltage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propulsion system comprising:
    a motor drive;
    a direct current (DC) link electrically coupled to the motor drive;
    a first leg coupled to the DC link and comprising a first power switch coupled in series with a second power switch via a first node;
    a first inductor coupled to the first node, wherein the first leg and inductor form a first bi-directional DC-DC voltage converter;
    a first energy storage device (ESD) electrically coupled to the first inductor;
    a second leg coupled to the DC link and comprising a third power switch coupled in series with a fourth power switch via a second node;
    a second inductor coupled to the second node, wherein the second leg and second inductor form a second bi-directional DC-DC voltage converter;
    a charging circuit comprising a transformer having a first terminal coupled to the first node and having a second terminal coupled to the second node;
    a second ESD coupled to receive charging energy from the transformer; and
    a controller coupled to the first and second legs and configured to cause a first variable voltage difference between the first and second nodes during an interleave duration of a frequency period to generate the charging energy, wherein the second ESD can be charged during operation of the motor drive.

2. The propulsion system of claim 1 wherein the controller is further configured to vary the interleave duration based on a desired amount of the charging energy to be supplied to the second ESD.

3. The propulsion system of claim 1 wherein the first ESD has a higher voltage capacity than the second ESD.

4. The propulsion system of claim 1 wherein the first ESD is electrically coupled to the second inductor.

5. The propulsion system of claim 4 wherein the controller, in being configured to cause the first voltage difference, is configured to operate the first and second legs in a boost mode to boost a voltage of the first ESD to the DC link.

6. The propulsion system of claim 1 wherein the controller is further configured to cause a voltage match between the first and second nodes to eliminate the charging energy.

7. The propulsion system of claim 6 wherein the controller is further configured to cause a second voltage difference between the first and second nodes during the frequency period to generate the charging energy, wherein the first and second voltage differences have a duration equal to the interleave duration.

8. The propulsion system of claim 1 wherein the transformer comprises:
    a first winding coupled to the first and second terminals; and
    a second winding; and
    wherein the charging circuit further comprises:
    a plurality of diodes coupled to the second winding; and
    an inductor coupled between the plurality of diodes and the second ESD.

9. The propulsion system of claim 8 wherein the plurality of diodes comprises a full-wave diode bridge.

10. The propulsion system of claim 8 wherein the transformer further comprises a winding tap coupled to the second winding; and
    wherein the second ESD is further coupled to the winding tap.

11. The propulsion system of claim 1 further comprising a third pair of power switches comprising a fifth power switch coupled in series with a sixth power switch via a third node.

12. A method of assembling a control system comprising:
    coupling a first energy storage device (ESD) to a first bi-directional DC-DC converter, the first bi-directional DC-DC converter comprising:
    a first pair of power switches coupled in series; and
    an inductor coupled to a first node formed between the first pair of power switches;
    coupling the first ESD to a second bi-directional DC-DC converter, the second bi-directional DC-DC converter comprising:

a second pair of power switches coupled in series; and
an inductor coupled to a second node formed between the second pair of power switches;

coupling the first and second bi-directional DC-DC converters to a DC link;

coupling the DC link to a motor drive;

coupling a transformer of a charge circuit to the first and second nodes;

coupling a second ESD to the charge circuit to receive a charge voltage therefrom; and coupling a controller to the first and second bi-directional DC-DC converters and configuring the controller to interleave control of the first and second bi-directional DC-DC converters to cause a variable voltage difference between the first and second nodes during an interleave portion of a frequency period to generate the charge voltage, wherein the second ESD can be charged during operation of the motor drive.

13. The method of claim 12 further comprising configuring the controller to:
increase the interleave portion of the frequency period to increase the amount of charge voltage generated; and
decrease the interleave portion of the frequency period to decrease the amount of charge voltage generated.

14. The method of claim 12 wherein coupling the first ESD to the first bi-directional DC-DC converter comprises coupling a first battery having a first voltage rating to the first bi-directional DC-DC converter;
wherein coupling the second ESD to the charge circuit comprises coupling a second battery having a second voltage rating to the charge circuit; and
where the second voltage rating is lower than the first voltage rating.

15. The method of claim 14 further comprising coupling an auxiliary load to the second ESD.

16. An energy storage arrangement for an electrically powered system, the arrangement comprising:
a first bi-directional DC-DC converter comprising:
a first pair of power switches comprising a first power switch coupled in series with a second power switch via a first node; and
a first inductor coupled to the first node;
a first energy storage device coupled to the first inductor;
a DC link comprising:
a first bus coupled to the first bi-directional DC-DC converter; and
a second bus coupled to the first bi-directional DC-DC converter;
a second pair of power switches comprising:
a third power switch coupled to the first bus; and
a fourth power switch coupled to the second bus and coupled in series with the third power switch via a second node;
a second inductor coupled to the first energy storage device;
a transformer having a first winding comprising:
a first terminal coupled to the first node; and
a second terminal coupled to the second node;
a second energy storage device coupled to receive a charge voltage from the transformer;
a controller coupled to the first and second pairs of power switches and configured to cause a voltage difference between the first and second nodes during an interleave portion of a frequency period to generate the charge voltage; and
an inductor switch coupled between the second inductor and the second node, wherein the controller is further configured to:
close the inductor switch; and
control the second pair of power switches to cause the second pair of power switches to boost a voltage of the first energy storage device to the DC link.

17. The energy storage arrangement of claim 16 wherein the first energy storage device comprises a battery having a first voltage rating, and wherein the second energy storage device comprises a battery having a second voltage rating lower than the first energy storage device.

18. The method of claim 16 wherein the controller is further configured to:
open the inductor switch; and
control the first and second pair of power switches as a phase-shifted converter.

19. The energy storage arrangement of claim 17 wherein the controller is further configured to vary the interleave portion based on a desired amount of the charge voltage to be supplied to the second energy storage device.

20. A propulsion system comprising:
a motor drive;
a direct current (DC) link electrically coupled to the motor drive;
a first leg coupled to the DC link and comprising a first power switch coupled in series with a second power switch via a first node;
a first inductor coupled to the first node, wherein the first leg and inductor form a first bi-directional DC-DC voltage converter;
a first energy storage device (ESD) electrically coupled to the first inductor;
a second leg coupled to the DC link and comprising a third power switch coupled in series with a fourth power switch via a second node;
a charging circuit comprising a transformer having a first terminal coupled to the first node and having a second terminal coupled to the second node;
a second ESD coupled to receive charging energy from the transformer; and
a controller coupled to the first and second legs and configured to cause a variable voltage difference between the first and second nodes during an interleave duration of a frequency period to generate the charging energy, wherein the second ESD can be charged during operation of the motor drive.

* * * * *